Patented Aug. 14, 1934

1,970,363

UNITED STATES PATENT OFFICE 1,970,363

METHOD OF PRODUCING ORTHO-DIHYDROXY BENZENES

Frederick Baxter Downing, Carneys Point, N. J., and Richard Gesse Clarkson, Wilmington, Del., assignors to E. I. du Pont de Nemours & Company, Wilmington, Del., a corporation of Delaware No Drawing. Application December 9, 1932, Serial No. 646,564

10 Claims. (Cl. 260—154)

This invention relates to polyhydroxy aromatic compounds, more particularly o-dihydroxy compounds of the benzene series, and a process for the manufacture thereof.

It has been found that o-dihydroxy compounds of the benzene series may be produced by the hydrolysis of o-dihalogen compounds of the benzene series, for example, by the direct hydrolysis of o-dihalogen compounds of the benzene series with water and alkaline hydrolyzing agents in the presence of barium or strontium ions, as described in a co-pending application of F. B. Downing, R. G. Clarkson and H. H. Reynolds, Serial No. 632,630. The method described is especially valuable on account of its commercial practicability in the production of o-dihydroxy benzene from o-dichloro benzene.

In producing o-dihydroxy benzene by this method, the reacting substances are normally charged into a closed vessel or autoclave and the reaction allowed to proceed to completion under suitable physical conditions. The o-dihydroxy benzene is then recovered from the reaction product in any convenient manner. In order to obtain the best yields in a process of this type and, in fact, in order to obtain commercially practical yields, it has been found desirable to carry out the hydrolysis in the presence of relatively large amounts of water or, in other words, to use a relatively low alkali concentration. The output of a given autoclave, therefore, is necessarily limited.

It is an object of the present invention to provide a new and improved process for producing o-dihydroxy compounds of the benzene series. A further and more specific object is the provision of a new and improved process for the production of o-dihydroxy benzene. Another object is the provision of a method of increasing the output of a given reaction vessel in the production of o-dihydroxy benzenes by the hydrolysis of o-dihalogen benzenes with water and alkaline hydrolyzing agents in the presence of barium or strontium ions. Other objects will appear hereinafter.

These objects are accomplished according to the present invention whereby in the production of o-dihydroxy compounds of the benzene series by the alkaline hydrolysis of an o-dihalogen compound of the benzene series, for example, such as described in the co-pending application previously referred to, the process is characterized by the improvement that at least a part of the alkaline hydrolyzing agent is added to the reaction zone as the reaction proceeds.

While the invention is susceptible to considerable variation and modification in the manner of its practical application, particularly as regards the proportions of materials, temperatures, pressures and the exact method of procedure, the following examples, in which the parts are by weight, will serve to illustrate how it may be practiced.

Example I

A steel autoclave provided with a means of agitation was charged with 22 parts of o-dichlorobenzene, 37 parts of barium chloride (BaCl$_2$.2H$_2$O), 45.5 parts of a 31% aqueous solution of sodium hydroxide, 85 parts of water, .07 parts of cuprous oxide, .25 parts of sodium formate. The size of the autoclave was such that the reactants filled it to about three-fourths of its operating capacity. It will be understood that by operating capacity, as herein referred to, is meant about 80% of the total volume inside of the autoclave under the conditions of reaction. The autoclave was then heated to about 275° C., and as soon as this temperature was attained, about 27 parts of 37% sodium hydroxide solution were pumped into the reaction zone at the rate of 9 parts per hour. The autoclave was heated for a further seven hours, making a total of ten hours at 275° C. The autogenous pressure developed was about 850 to 950 pounds per square inch. The autoclave was then cooled, opened, and the contents washed out with water into a suitable receiver. The mixture of water solution and suspended barium salt of o-dihydroxy benzene was made acid with a 20% solution of hydrochloric acid, and the mixture heated gently for a few minutes. The solution was then filtered to remove any undissolved solids and extracted with ether. The ether was evaporated from the extract and the o-dihydroxy benzene recovered by vacuum distillation.

The amount of alkaline hydrolyzing agent added to the autoclave according to the foregoing procedure was such that after the addition the autoclave was loaded to its full operating capacity. The initial alkali concentration was about 2.9 normal. As the reaction proceeded, the sodium hydroxide was gradually used up, and this was replaced by the more concentrated sodium hydroxide solution, which was added to the reaction mixture at such a rate that the concentration of the sodium hydroxide in the aqueous phase at no time exceeded the initial concentration (2.9 normal). The yield of o-dihydroxy benzene was about 9.79.

For comparison, the same autoclave was then charged with 15 parts of o-dichloro benzene, 24.5 parts of barium chloride ($BaCl_2.2H_2O$), 52 parts of a 31% aqueous solution of sodium hydroxide, 97.5 parts of water, .07 parts of cuprous oxide, and .25 parts of sodium formate. With this charge the autoclave was loaded to its full operating capacity. It was then heated at 275° C. for ten hours, and the o-dihydroxy benzene recovered as previously described. The yield of o-dihydroxy benzene was about 6.93 parts.

It will be noted that the initial alkali concentration was the same (namely, 2.9 normal) in both of the foregoing procedures. The total amount of alkali used, based on the o-dichloro benzene, was also the same (namely, about four moles of sodium hydroxide per mole of o-dichloro benzene). The amount of water present in the second case, however, was more than the total amount of water charged into and added subsequently to the autoclave according to the first procedure. The output of the autoclave, according to the first procedure, was greatly increased, being about 41% greater per charge than that according to the second procedure.

When, according to the first procedure, the sodium hydroxide was not pumped into the reaction zone during the reaction but was all charged into the autoclave initially, the yield obtained was only about 6.58 parts of o-dihydroxy benzene or about two-thirds of the yield resulting when the device of pumping in the sodium hydroxide during the reaction was used.

Example II

Into an autoclave such as described in Example I there were charged 22 parts of o-dichloro benzene, 37 parts of barium chloride ($BaCl_2.2H_2O$), 45.5 parts of a 31% aqueous solution of sodium hydroxide, 90 parts of water, .07 parts of cuprous oxide, and .25 parts of sodium formate. The autoclave was heated to 275° C. and 21 parts of a 48% sodium hydroxide solution were pumped in at the rate of 7 parts per hour. The heating was continued for a further seven hours, making a total of ten hours' heating at 275° C. The results obtained were comparable to those obtained according to the first procedure of Example I. The increase in the production of o-dihydroxy benzene by pumping in sodium hydroxide during the reaction was about 41% greater than that obtained by loading the autoclave to its full operating capacity initially with a reaction mixture having the same alkali concentration.

Example III

A steel autoclave such as described in Example I was charged with 22 parts of o-dichloro benzene, 47.5 parts of barium hydroxide-octahydrate ($Ba(OH)_2.8H_2O$), .07 parts of cuprous oxide, .25 parts of sodium formate, and 105 parts of water, these proportions of water corresponding to an alkaline concentration of about 2.4 normal. The autoclave was maintained at a temperature of about 275° C. during a period of about three hours, and 25 parts of a 48% sodium hydroxide solution were pumped into the reaction zone at the rate of 8 parts per hour. The heating was thereafter continued for a further seven hours. The autogenous pressure developed during the reaction was about 850 to 950 pounds per square inch. The autoclave was then cooled, opened, and the o-dihydroxy benzene recovered as described in Example I. The results with regard to increased capacity were about the same as those obtained in Examples I and II.

Example IV

A steel autoclave was charged with 11 parts of o-dichloro benzene, 18.5 parts of barium chloride ($BaCl_2.2H_2O$), 19 parts of a 31% sodium hydroxide solution, 0.04 parts of cuprous oxide, 0.25 parts of sodium formate, and 104 parts of water, these proportions of water being such that the alkali concentration was about 1.2 normal. The autoclave was heated to a temperature of about 275° C., and 10 parts of a 48% sodium hydroxide solution were pumped in at the rate of about 3 parts per hour. After a total of ten hours' heating at 275° C., the pressure was released, the autoclave was cooled, and the o-dihydroxy benzene recovered as described in Example I. The results obtained with regard to increased capacity of the autoclave were substantially the same as those obtained according to the procedure of Example II.

It will be understood that the process of the invention is not limited by the foregoing examples. The character and proportions of the reactants, the temperatures, pressures and catalysts may be the same as described in the co-pending application of F. B. Downing, R. G. Clarkson and H. H. Reynolds, Serial No. 632,630, except that instead of introducing all of the alkaline hydrolyzing agent into the reaction zone initially, at least a part is added as the reaction proceeds. The method of removing oxygen from the zone of hydrolysis by the use of sodium formate or other suitable means may be the same as described in the co-pending application of F. B. Downing and R. G. Clarkson, Serial No. 641,318.

As indicated in the foregoing co-pending applications, the use of catalysts and/or the removal of oxygen from the zone of hydrolysis are not essential but greatly improve the yields obtained.

Especially desirable results have been obtained in the application of the invention to the production of o-dihydroxy benzene from o-dichloro benzene. Instead of o-dichloro benzene, other o-dihalogen benzenes such as o-dibromo benzene or o-di-iodo benzene may be used. These are not generally considered to be equivalent to the o-dichloro benzene since, in general, it is easier to effect the reactions of the character herein described with bromine and iodine derivatives than with chlorine derivatives. The invention is also applicable to the production of o-dihydroxy compounds of the benzene series from substituted o-dihalogen benzenes as, for example, those containing alkyl ($-CH_3$, $-C_2H_5$, etc.), nitro, alkoxy ($-OCH_3$, $-OC_2H_5$, etc.), and the like substituents. Since the substituent groups may activate the halogens in the positions ortho to each other, it will be understood that the substituted dihalogen derivatives are not, in general, equivalents of the unsubstituted dihalogen derivatives.

The proportions of reactants may vary widely. Good results may be obtained by reacting together an o-dihalogen benzene, water, hydroxyl ions and barium or strontium ions, preferably in the presence of a catalyst and a reducing agent in proportions corresponding to about one mole of o-dihalogen benzene, about two to about four equivalents of a water-soluble barium or strontium compound, about two to about six equivalents of hydroxyl, an amount of water corresponding to an alkali concentration below about 3.6 normal, a small amount of catalyst and a small amount of reducing agent. The catalyst may be any substance which is effective in catalysing the Ullmann reaction. As specific examples of such catalysts may be mentioned silver, copper, iodides and iodates of alkali metals, salts and oxides of vanadium, tungsten, molybdenum, silver, copper and the rare earth metals. The water-soluble barium or strontium compound may be, for example, barium chloride, barium bromide, barium iodide, barium acetate and the corresponding strontium compounds. The barium or strontium ions may also be introduced in the form of barium or strontium hydroxides (cf. Example III).

The temperature of the reaction may vary widely, but should preferably be above about 250° C. and below the decomposition temperature of the o-dihydroxy benzene under the conditions of reaction. The pressure should preferably be such as to maintain the reaction mixture in liquid phase.

The preferred procedure in producing o-dihydroxy benzene involves heating together, under autogenous pressure at a temperature of about 275° C. to about 285° C., in liquid phase, o-dichloro benzene, water, hydroxyl ions, a water-soluble barium or strontium compound, a catalyst for the Ullmann reaction and a reducing agent in proportions corresponding to about one mole of o-dichloro benzene, about one mole of barium or strontium salt, preferably barium chloride, less than four equivalents of hydroxyl, preferably introduced into the reaction zone as sodium hydroxide, an amount of reducing agent, preferably sodium formate, sufficient to combine with the free oxygen in the reaction vessel, about .05% to about 2% (based on the weight of o-dichloro benzene) of catalyst, preferably cuprous oxide, an amount of water corresponding to an alkali concentration not exceeding about 2.9 normal, and adding to the reaction zone during the course of the reaction a water-soluble alkaline hydroxide, such as sodium hydroxide, at such a rate and in such proportions that the amount of hydroxyl does not exceed about four equivalents per mole of o-dihalogen benzene and the concentration of hydroxyl corresponds to an alkali concentration not exceeding about 2.9 normal.

The method of procedure in adding the various reactants may vary widely. The barium or strontium ions are preferably introduced into the reaction mixture initially in the form of a water-soluble barium or strontium salt. It will be understood, however, that barium or strontium ions may be added to the reaction zone during the course of the reaction in any suitable manner, for example, as a water-soluble salt or in the form of barium or strontium hydroxide. If desired, all of the hydroxyl ions may be added to the reaction mixture in the form of the barium or strontium hydroxides. However, since according to the preferred procedure, the proportions of reactants correspond to one mole of barium or strontium per mole of o-dihalogen benzene and four equivalents of hydroxyl per mole of o-dihalogen benzene, and since, furthermore, the barium or strontium compounds are relatively expensive to manufacture, it is preferable to effect the reaction by the introduction of at least a part of the hydroxyl ions, and preferably at least two equivalents of hydroxyl, in the form of a water-soluble alkaline hydroxide other than barium or strontium hydroxide. For this purpose, the alkali metal hydroxides, such as sodium hydroxide and potassium hydroxide, are preferably employed.

While, as previously indicated, it is preferable that the total alkalinity during the reactions should at no time exceed an alkali concentration of about 3.6 normal and should preferably be about 2.9 normal, it will be understood that the lower alkali concentrations may be used. In fact, lower alkali concentrations tend to increase the yields. On the other hand, the presence of increased amounts of water decreases the capacity of a given reaction vessel. In general, we prefer to use at least enough water initially to dissolve the barium or strontium salt, for example, barium chloride. The presence of undissolved barium or strontium salt apparently tends to decrease the yield.

The method of introducing the water and alkaline hydroxide during the course of the reaction may vary widely. If desired, they may be introduced separately, but it is preferable to introduce both the water and the hydroxide in the form of a concentrated solution. The temperature of the solution may be room temperature or higher temperatures. The concentration will be limited by the solubility of the hydroxide in water at the temperature used. Thus, good results have been obtained in the use of solutions of sodium hydroxide having concentrations not greater than about 48% at room temperature. With more concentrated solutions, there is a risk of clogging the pump and bursting the equipment. Instead of using a pump in introducing the solution of alkaline hydroxide any other suitable means, such as, for example, an equalizing tank, may be used. Where the alkaline hydroxide is added to the reaction zone as a solution of barium or strontium hydroxide, the solution should preferably be maintained at temperatures above about 50° C. In general, higher temperatures are desirable in the addition of solutions of the alkaline earth hydroxides because of the lower solubility of these hydroxides than those of the alkali metals, such as sodium, potassium and lithium hydroxide. It will be understood, in carrying out the reaction, that any combination of alkaline hydroxides and/or barium or strontium salts may be used.

The invention is advantageous from the practical standpoint because by its use increased output may be obtained from a given reaction vessel. This effects considerable economies in investment, labor and time. A novel feature of the invention lies in the unexpected result that the presence of higher concentrations of salts than have been hitherto used do not affect the yield or purity of the product.

As many apparently widely different embodiments of this invention may be made without departing from the spirit and scope thereof, it is to be understood that we do not limit ourslves to the specific embodiments thereof except as defined in the following claims.

We claim:

1. In a process of producing o-dihydroxy compounds of the benzene series by the hydrolysis of o-dihalogen compounds of the benzene series in the presence of water, hydroxyl ions and metal ions selected from the group consisting of barium and strontium, the improvement which comprises introducing hydroxyl ions into the reaction mixture by the addition of a water-soluble alkaline hydroxide as the reaction proceeds.

2. In a process of producing o-dihydroxy compounds of the benzene series by the hydrolysis of o-dihalogen compounds of the benzene series in the presence of water, hydroxyl ions and metal ions selected from the group consisting of barium and strontium, the improvement which comprises introducing hydroxyl ions into the reaction mixture by the addition of a water-soluble alkaline hydroxide as the reaction proceeds, the proportions and rate of introduction of said alkaline hydroxide being such that the alkali concentration of the reaction mixture is not greater than about 2.9 normal.

3. In a process of producing o-dihydroxy compounds of the benzene series by the hydrolysis of o-dihalogen compounds of the benzene series in the presence of water, hydroxyl ions, and metal ions selected from the group consisting of barium and strontium, the improvement which comprises introducing hydroxyl ions into the reaction mixture by the addition of an aqueous solution of an alkaline hydroxide as the reaction proceeds, the proportions and rate of introduction of said alkaline hydroxide being such that the alkali concentration of the reaction mixture is not greater than about 2.9 normal.

4. In a process of producing o-dihydroxy benzene by the hydrolysis of o-dichloro benzene in the presence of water, hydroxyl ions and metal ions selected from the group consisting of barium and strontium, the improvement which comprises introducing hydroxyl ions into the reaction mixture by the addition of a water-soluble alkaline hydroxide as the reaction proceeds, the proportions and rate of introduction of same alkaline hydroxide being such that the alkali concentration of the reaction mixture is not greater than about 2.9 normal.

5. The process of claim 4 in which the water-soluble alkaline hydroxide is an alkali metal hydroxide.

6. The process of claim 4 in which the water-soluble alkaline hydroxide is sodium hydroxide.

7. The process of producing o-dihydroxy benzene which comprises reacting together in liquid phase o-dichloro benzene, water, hydroxyl ions, a water-soluble compound selected from the group consisting of barium and strontium compounds, a catalyst for the Ullmann reaction, and a reducing agent, in proportions corresponding to about one mole of o-dichloro benzene, about two to about four equivalents of water-soluble barium or strontium compounds, less than four equivalents of hydroxyl, an amount of reducing agent sufficient to combine with the free oxygen in the reaction vessel, and an amount of water corresponding to an alkali concentration not exceeding about 2.9 normal, maintaining the temperature of the reaction zone above about 250° C. and below the decomposition temperature of the formed salt of o-dihydroxy benzene, and adding to the reaction zone during the course of the reaction a water-soluble alkaline hydroxide at such a rate and in such proportions that the amount of hydroxyl does not exceed about four equivalents per mole of o-dihalogen benzene and the concentration of hydroxyl corresponds to an alkali concentration not exceeding about 2.9 normal.

8. The process of producing o-dihydroxy benzene which comprises heating together in liquid phase about 22 parts of o-dichloro benzene, about 37 parts of $BaCl_2 \cdot 2H_2O$, about 45.5 parts of a 31% solution of sodium hydroxide, about 85 parts of water, about 0.07 parts of cuprous oxide, and about 0.25 parts of sodium formate, maintaining the temperature of the reaction mixture at about 275° C., introducing into the reaction zone about 27 parts of a 37% solution of sodium hydroxide at the rate of about 9 parts per hour, and recovering o-dihydroxy benzene from the resultant product.

9. In a process of producing an o-dihydroxy compound of the benzene series by the hydrolysis of an o-dihalogen compound of the benzene series in the presence of hydroxyl ions and ions of a metal forming an insoluble salt of the o-dihydroxy benzene compound, the improvement which comprises adding the hydroxyl ions to the reaction zone as the reaction proceeds.

10. In a process of producing o-dihydroxy benzene by the hydrolysis of o-dichloro benzene in the presence of hydroxyl ions and ions of a metal forming an insoluble salt of the o-dihydroxy benzene, the improvement which comprises introducing the hydroxyl ions into the reaction zone as the reaction proceeds.

FREDERICK B. DOWNING.
RICHARD G. CLARKSON.